US007677198B2

(12) United States Patent
Cheng et al.

(10) Patent No.: US 7,677,198 B2
(45) Date of Patent: Mar. 16, 2010

(54) METHOD AND APPARATUS FOR GROWING A COMPOSITE METAL SULPHIDE PHOTOCATALYST THIN FILM

(75) Inventors: Kong-Wei Cheng, Hsinchu (TW); Jau-Chyn Huang, Hsinchu (TW); Ching-Chen Wu, Taichung County (TW); Tai-Chou Lee, Chiayi County (TW); Ching-Sung Hsiao, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 1143 days.

(21) Appl. No.: 11/287,854

(22) Filed: Nov. 28, 2005

(65) Prior Publication Data

US 2007/0122564 A1 May 31, 2007

(51) Int. Cl.

| | |
|---|---|
| ***B05C 3/02*** | (2006.01) |
| ***B05B 5/00*** | (2006.01) |
| ***B05B 13/00*** | (2006.01) |
| ***G01N 21/49*** | (2006.01) |

(52) U.S. Cl. ........................ 118/428; 118/402; 118/407; 118/500; 118/641; 250/574; 250/222.2

(58) Field of Classification Search ................. 118/400, 118/402, 407, 428, 641–643; 117/200, 206, 117/57, 61, 54, 103, 108, 204; 250/574, 250/222.2; 422/101

See application file for complete search history.

(56) References Cited

U.S. PATENT DOCUMENTS 4,672,218 A * 6/1987 Chrisman et al. ........... 250/574
6,315,966 B1 * 11/2001 Baumgard et al. ....... 422/245.1
7,014,711 B2 * 3/2006 Mizutani et al. ............ 117/200
7,060,132 B2 * 6/2006 Lindfors et al. ............... 117/93

FOREIGN PATENT DOCUMENTS

JP 01220431 A * 9/1989
JP 03237097 A * 10/1991
JP 2003-181297 A 7/2003
JP 2003-222746 A 8/2003
WO 03/051512 A1 6/2003

OTHER PUBLICATIONS

Tsuji, et al., Journal of the American Chemical Society, "Photocatalytic H2 Evolution from Aqueous Solutions Over Band Structure-Controlled (AgIn)xZn2(1-x)S2 Solid Solution Photocatalysts with Visible-Light Response and Their Surface Nanostructures", vol. 126, pp. 13406-13413 (2004).

Podder, et al., Journal of Crystal Growth, "Preparation and Characterization of CuInS2 Thin Films From Aqueous Solutions by Novel Photochemical Deposition Technique", vol. 275, pp. 937-942 (2005).

Nunez-Rodriquez, et al., Semiconductor Science and Technology, "Structural, Optical and Electrical Properties of Chemically Deposited Silver Sulfide Thin Films", vol. 20, pp. 576-585 (2005).

* cited by examiner

*Primary Examiner*—Yewebdar Tadesse
(74) *Attorney, Agent, or Firm*—Quintero Law Office

(57) ABSTRACT

A method and apparatus are provided for growing a composite metal sulphide photcatalyst thin film, wherein photochemical deposition and chemical bath deposition are both performed for growing the composite metal sulphide thin film, such as $(AgInS_2)_x/(ZnS)_{2(1-x)}$, wherein x is 0-1.

11 Claims, 6 Drawing Sheets

METHOD AND APPARATUS FOR GROWING A COMPOSITE METAL SULPHIDE PHOTOCATALYST THIN FILM

BACKGROUND OF THE INVENTION

The present invention generally relates to a method and an apparatus for growing thin film, and more particularly for growing a composite metal sulphide photocatalyst thin film.

With development of highly efficient photocatalyst materials as reported in scientific researches, their uses and applications have been widely extended to different fields. For example, in a hydolysis reaction catalyzed by a photocatalyst, a water molecule is broken down to produce hydrogen, water and carbon dioxide for generating fuels such as methanol, methane and so on. The photocatalyst has also been used conventionally for creating a better amenity environment. For example, transparent titanium oxide ($TiO_2$) film photocatalyst has been utilized under visible light or ultraviolet (UV) irradiation to decompose odors, bacteria and stains during the process of sterilization, oxidative decomposition, and deodorization.

Typically, most of the photocatalysts have been manufactured with material in the form of powders. Yet, it is more favorable, in terms of industrial applicability to manufacture a photocatalyst thin film which facilitates the design of industrial photoreactors. Japanese Patent JP2002-20108 has disclosed a method and apparatus for forming semiconductor thin film in aqueous solution. The photocatalyst thin film was formed by photochemical deposition (PCD) on a substrate that was irradiated with a light source. Japanese Patent JP2003-181297 has disclosed formation of a thin film-like photocatalyst by dipping a base material into the solution containing Zn and depositing ZnS, ZnO or the like on the surface of the base material by a chemical bath deposition (CBD) method.

However, none of the studies has been directed to manufacturing a composite metal sulphides photocatalyst thin film which is grown on a large scale basis.

BRIEF SUMMARY OF THE INVENTION

In one aspect the invention provides a method for growing a composite metal sulphide thin film, comprising steps of: immersing a first carrier for photochemical deposition and a second carrier for chemical bath deposition in a reaction tub filled with an alkaline solution comprising at least a metal ion and a sulphur-based compound, wherein the second carrier is arranged vertical to a bottom surface of the reaction tub; and irradiating the first carrier with a light source producing light, such that the metal sulphide thin film is grown by photochemical deposition and chemical bath deposition on the first and second carriers, respectively, wherein the sulphur-based compound comprises thiosulfate ($S_2O_3^{2-}$) and thiourea ($CSN_2H_4$).

In another aspect the invention provides an apparatus for growing a composite metal sulphide thin film, comprising: a reaction tub having a first carrier and a second carrier held within the reaction tub, wherein the second carrier is held vertical to a bottom surface of the reaction tub; and a light exposure assembly comprising a frame holding a light source in such a way that the light source is over the reaction tub for irradiating the first carrier.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
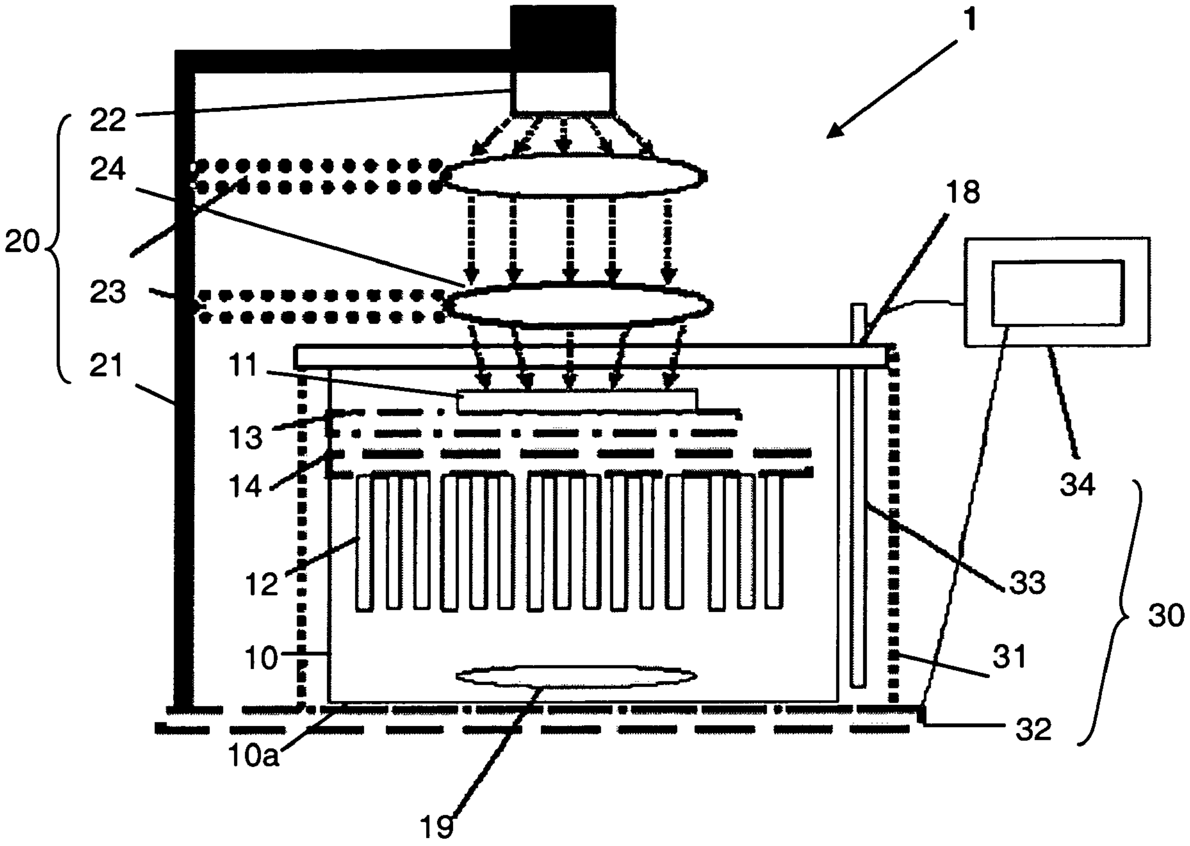
FIG. 1 is a schematic diagram illustrating an apparatus for growing metal sulphide thin film according to the present invention.

The present invention proposes a method and apparatus for growing a composite metal sulphide photcatalyst thin film. Two deposition methods, including photochemical deposition and chemical bath deposition, are used in the invention for growing the photocatalyst thin film, such as $(AgInS_2)_x/(ZnS)_{2(1-x)}$, wherein x is 0-1. However, the invention should not be limited to growing $AgInS_2$, ZnS or $AgInS_2/(ZnS)_2$ material. Other types of metal sulphides or composite metal sulphides grown by the method and apparatus described in details below are also within the scope of the present invention.

According to the invention, a method is provided for growing a composite metal sulphide thin film, comprising steps of: immersing a first carrier for photochemical deposition and a second carrier for chemical bath deposition in a reaction tub filled with an alkaline solution comprising at least a metal ion and a sulphur-based compound, wherein the second carrier is arranged vertical to a bottom surface of the reaction tub; and irradiating the first carrier with a light source producing light, such that the metal sulphide thin film is grown by photochemical deposition and chemical bath deposition on the first and second carriers; wherein the sulphur-based compound comprises thiosulfate ($S_2O_3^{2-}$) and thiourea ($CSN_2H_4$). In the photochemical deposition, a light ray or light beam from the light source irradiates the first carrier immersed in the alkaline solution comprising $S_2O_3^{2-}$, so that the thiosulfate may be excited by electron transition to generate electrons $e^-$ according to equations (1)-(3). In the method, the light source producing light preferably has a wavelength of less than 300 nm. Preferentially, $S_2O_3^{2-}$ may be potassium thiosulfate or sodium thiosulfate having a concentration of about 0.05-

0.1M in the solution. The reactions also generate chemical species such as $SO_3^{2-}$, $S_3O_6^{2-}$, $S_4O_6^{2-}$, and sulfur atoms (S) in the alkaline solution based on the following equations.

$$2S_2O_3^{2-}+h\nu \rightarrow S_4O_6^{2-}+2e^- \quad (1)$$

$$2S_2O_3^{2-}+h\nu \rightarrow S+SO_3^{2-} \quad (2)$$

$$S_2O_3^{2-}+SO_3^{2-}+h\nu \rightarrow S_3O_6^{2-}+2e^- \quad (3)$$

Then, the sulphur atoms and the electrons in the alkaline solution react with the metal ions to form metal sulphides. For example, the sulphur atoms and the electrons may react with $Zn^{2+}$, $Ag^+$ and $In^{3+}$ according to equations (4)-(7) to form zinc sulphide (ZnS), silver indium sulphide ($AgInS_2$), silver sulphide ($Ag_2S$) and indium sulphide ($In_2S_3$).

$$Zn^{2+}+S+2e^- \rightarrow ZnS \quad (4)$$

$$Ag^++In^{3+}+2S+4e^- \rightarrow AgInS_2 \quad (5)$$

$$2Ag^++S+2e^- \rightarrow Ag_2S \quad (6)$$

$$2In^{3+}+3S+6e^- \rightarrow In_2S_3 \quad (7)$$

In the chemical bath deposition, thiourea ($CSN_2H_4$) in the alkaline solution is used to produce sulphide ion ($S^{2-}$) based on equations (8) and (9). Preferably, thiourea is added at a concentration of about 0.05-1M in the solution. The solution comprises ammonium nitrate ($NH_4NO_3$) and ammonium hydroxide ($NH_4OH$) for adjusting pH of the alkaline solution. The alkaline solution is adjusted to a pH range, preferably 8-11 with $NH_4OH$. The solution pH is further stabilized by adding a buffer solution containing $NH_4NO_3$ preferably at a dose of 0.01-0.5M.

$$CS(NH_2)_2+OH^{31} \rightarrow SH^-+CH_2N_2+H_2O \quad (8)$$

$$SH^-+OH^- \rightarrow S^{2-}+H_2O \quad (9)$$

Then, the sulphide ions react with the metal ions to form metal sulphides. For example, the sulphide ions may react with $Zn^{2+}$, $Ag^+$ and $In^{3+}$ according to equations (10)-(13) to form zinc sulphide (ZnS), silver sulphide ($Ag_2S$), indium sulphide ($In_2S_3$) and silver indium sulphide ($AgInS_2$).

$$Zn^{2+}+S^{2-} \rightarrow ZnS \quad (10)$$

$$2Ag^++S^{2-} \rightarrow Ag_2S \quad (11)$$

$$2In^{3+}+3S^{2-} \rightarrow In_2S_3 \quad (12)$$

$$Ag^++In^{3+}+2S^{2-} \rightarrow AgInS_2 \quad (13)$$

Due to low solubility of the sulphide compounds, the chemical reactions of equations (10)-(13) occur simultaneously once the sulphide ions are generated. Instead of forming on the second carrier, most of the metal sulphide formation would take place in the solution. Therefore, $NH_4OH$ is further added to metal ions, forming metal complexes $M(NH_3)_y^{n+}$ according to equations (14)-(15). The metal complexes then react with the sulphide ions to form metal sulphides $MS_{n/2}$ according to equation (16).

$$NH_4OH \rightarrow NH_3 + H_2O \quad (14)$$

$$M^{n+} + yNH_3 \rightarrow M(NH_3)_y^{n+} \quad (15)$$

$$M(NH_3)_y^{n+} + \frac{n}{2}S^{2-} \rightarrow MS_{n/2} + yNH_3 \quad (16)$$

wherein M is a metal ion comprising at least one of $Ag^+$, $Zn^{2+}$, $In^{3+}$ and $(AgIn)^{4+}$, n is about 1-3 and y is about 2-6.

Since the chemical reaction of equation (16) takes place slowly at room temperature, the solution may be added with hydrazine ($N_2H_4$) and heated with a heating element to a temperature of about 30-90° C. for facilitating or speeding up the chemical reaction of equation (16). Preferably, the hydrazine may be added at a concentration of about 0.01-1M in the solution. In addition, $S_2O_3^{2-}$ from the photochemical reaction may also react with the metal ions in the solution to form metal complexes according to equation (17).

$$yM^{n+} + zS_2O_3^{2-} \rightarrow [M_y^{n+}(S_2O_3^{2-})_z]^{ny-2z} \quad (17)$$

wherein n is about 1-3, y is about 2-6 and z is about 2-6.

The metal complexes as formed in equation (17) then react with sulphide ions in the solution to form metal sulphides on the second carrier in accordance with equation (18). Thus, the chemical bath deposition should not be limited to the chemical reactions as defined by the equations (8)-(16), other chemical reactions of equations (17) and (18) are also applicable to the chemical bath deposition for forming the metal sulphide photocatalyst thin film on the second carrier.

$$[M_y^{n+}(S_2O_3^{2-})_z]^{ny-2z} + \frac{ny}{2}S^{2-} \rightarrow yMS_{\frac{n}{2}} + zS_2O_3^{2-} \quad (18)$$

wherein n is about 1-3, y is about 2-6 and z is about 2-6.

In accordance with one preferred embodiment, the solution comprises silver nitrate ($AgNO_3$), indium nitrate ($In(NO_3)_3$), zinc nitrate ($Zn(NO_3)_2$), ammonium nitrate ($NH_4NO_3$), sodium thiosulfate ($Na_2S_2O_3$) and thiourea ($CSN_2H_4$) in a mole ratio of m:m:2(1−m):(1 to 20)m:(100 to 2000)m:(9 to 100)m, wherein m is greater than zero up to about 1.

In accordance with another embodiment, the solution comprises silver nitrate ($AgNO_3$), indium nitrate ($In(NO_3)_3$), zinc nitrate ($Zn(NO_3)_2$), $NH_4NO_3$, potassium thiosulfate ($K_2S_2O_3$) and thiourea ($CSN_2H_4$) in a mole ratio of m:m:2(1−m):(1 to 20)m:(100 to 2000)m:(9 to 100)m, wherein m is greater than zero up to about 1.

To ensure the crystallinity of the thin film grown, a thermal process is further performed for curing the metal sulphide thin film. Preferably, the metal sulphide thin film is cured at a temperature of about 130° C. for two hours to remove water content within the thin film. Next, a thermal process is further performed in a high temperature furnace flushed with nitrogen gas. Preferably, a sintering process is performed on the metal sulphide thin film at a temperature of about 200-1000° C. for about 6-12 hours before cooling to a room temperature to yield metal sulphide thin film.

The invention also provides an apparatus for growing a composite metal sulphide photocatalyst thin film. Referring to FIG. 1, the apparatus 1 comprises a reaction tub 10 having a first carrier 11 and second carrier 12 held within the reaction tub 10, wherein the second carrier is held vertical to a bottom surface of the reaction tub 10. The apparatus 1 also comprises a light exposure assembly 20 which comprises a frame 21 holding a light source 22 in such a way that the light source 22 is over the reaction tub 10. The light source 22 includes but is not limited to a xenon lamp, a high pressure mercury lamp or a low pressure mercury lamp that produces light with a wavelength of less than 300 nm. Other light sources 22 that produce ultraviolet (UV) light with a wavelength of less than 300 nm are equally applicable in the invention.

Figure 2:
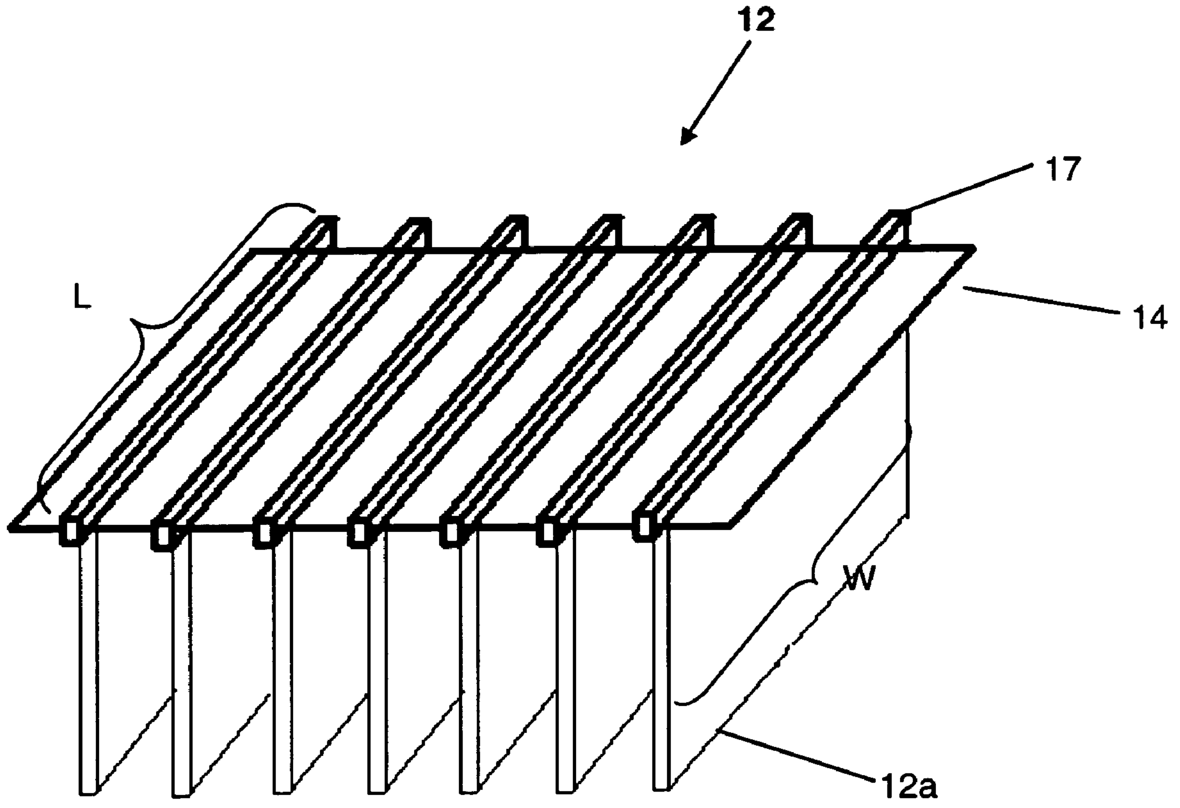
FIG. 2 is a perspective view of a second carrier for growing the metal sulphide thin film thereon.

In accordance with one embodiment, the first carrier 11 and the second carrier 12 are held in the reaction tub 10 by a first carrier holder 13 and a second carrier holder 14, respectively, and the second carrier 12 is held vertical to a bottom surface 10*a* of the reaction tub 10. As shown in FIG. 2, the second carrier 12 may include a plurality of substrates 12*a* held side-by-side by the second carrier holder 14 with a gap of about 1-10 mm between two adjacent substrates 12*a*. The second carrier holder 14 may also be provided with a plurality of bars 17, each bar 17 having a length L longer than width W of each substrate 12*a* to ensure that the second carrier 12 is held upright in the reaction tub 10. The first and second carriers 11 and 12 are made of material comprising at least one of iron (Fe), copper (Cu), Boron Phosphorous Silicon Glass (BPSG), silicon glass, indium tin oxide (ITO) glass, and other glass.

Referring to FIG. 1 again, the frame 21 may further include a lens holder 23 which holds a lens assembly 24 between the light source 22 and the first carrier 11 to adjust light exposure area on the first carrier 11. The lens assembly 24 may be one or more than one lens to control light beam incident onto the first carrier 11 as the light source 22 passes a light beam through the lens assembly. Thus, the light source 22 may be arranged at a focal point of one lens to produce a parallel light beam which is converged by another lens to form a high intensity of light beam area. By moving the lens assembly 24 up and down along the frame 21, the lens assembly 24 is either brought near to the first carrier 11 to achieve a large exposure area or drawn a distance away from the first carrier 11 to achieve a small exposure area depending on the exposure area desired. The frame 21 may be made of a strengthened material, such as reinforced plastic or metal which is capable of holding the light source 22 and lens assembly 24 thereon.

To ensure that a solution concentration is not changed by evaporation or contamination by pollutants, the reaction tub 10 may include a lid 18 to keep the solution closed in the reaction tub. The lid 18 may be made of transparent material to allow light having the wavelength of less than 300 nm to pass through. For example, the lid 18 may be made of a quartz glass lid or a glass lid.

The reaction tub 10 may further include a stirring component 19 adjacent the bottom surface 10*a* of the reaction tub 10 for stabilizing the solution concentration. The stirring component 19 may be a stirring member or a stirring device provided in the reaction tub 10 to stabilize the concentration of the solution.

The apparatus 1 may also include a temperature regulating assembly 30 for maintaining the reaction tub 10 at a temperature optimal for performing chemical bath deposition. For example, the temperature is kept at about 30-90° C. via the temperature control assembly 30 which comprises a thermostatic assembly 31 for keeping the temperature of the solution constant, a heating element 32 for heating up the solution, a temperature detector 33, and a temperature controller 34 for monitoring the temperature change of the solution. The temperature detector 33 is coupled to the thermostatic assembly 31 for controlling the temperature in the reaction tub, and may be a thermometer, a k-type thermocouple, J-type thermocouple or other devices for measuring the temperature of the thermostatic assembly 31. The reaction tub 10 is bathed in the thermostatic assembly 31, such as a steam bath containing water vapor, an oil bath containing silicon oil or a water bath containing water to keep the temperature of the solution constant.

The heating element 32 may be a heating plate, a heat rod, a heating filament, a heating belt, or other similar heating structure, and the heating element 32 may be switched on/off by the temperature controller 34 based on the temperature detected by the temperature detector 33. For example, when the temperature of the solution drops below the range of 30-90° C., the heating element 32 is turned on by the temperature controller 34 to heat up the solution via the thermostatic assembly 31. On the other hand, as the temperature exceeds the range, the heating element 32 is turned off by the temperature controller 34.

With respect to the apparatus 1 described above, a method for growing the composite metal sulphide photocatalyst thin film is also provided. The method for growing metal sulphide photocatalyst thin film comprises immersing first and second carriers 11 and 12 in a reaction tub 10 filled with an alkaline solution comprising at least a metal ion and a sulphur-based compound, wherein the second carrier 12 is arranged vertical to a bottom surface of the reaction tub 10. The sulphur-based compound is defined as a compound containing sulphur and comprises thiosulfate ($S_2O_3^{2-}$) and thiourea ($CSN_2H_4$).

In the alkaline solution, the metal ion comprises at least one of silver ions ($Ag^+$), copper ions ($Cu^+$), zinc ions ($Zn^{2+}$), cadmium ions ($Cd^{2+}$), indium ions ($In^{3+}$), tantalum ions ($Ta^{3+}$), titanium ions ($Ti^{4+}$), $CuIn^{4+}$, $AgIn^{4+}$, and sulfate, nitrate and carbonate salt compounds thereof to provide cations in the subsequent photochemical deposition process and chemical bath deposition process. Preferably, the metal ion has a concentration of about $1\times10^{-4}$M-0.5M in the alkaline solution to form metal complexes with a corresponding complexing agent. The alkaline solution may be prepared by adding the metal ion in a sulfur-based compound solution or adding the sulfur-based compound solution in an aqueous solution containing the metal ion.

As the first carrier 11 is irradiated with a light source 22 having a wavelength of less than 300 nm, the metal sulphide thin film is grown by photochemical deposition and chemical bath deposition on the first and second carriers 11 and 12.

In the photochemical deposition, light ray or light beam from the light source 22 passes through the lens assembly 24 to irradiate the first carrier 11 immersed in the alkaline solution comprising $S_2O_3^{2-}$, so that the thiosulfate may be excited by electron transition to generate electrons $e^-$.

The invention will now be described in further detail with reference to the following specific, non-limiting examples.

Example 1

Growth of $(AgInS_2)_x/(ZnS)_{2(1-x)}$ Composite Thin Film

Referring to FIG. 1, the first and second carriers 11 and 12 are immersed in a reaction tub 10 which is filled with an electroplating solution comprising silver nitrate, indium nitrate, zinc nitrate, ammonium nitrate, sodium thiosulfate, and thiourea in a mole ratio of 1:1:7:36:430-2000:9-100. In other words, the solution comprises silver nitrate at a concentration of about $3.57\times10^{-4}$M-$1.27\times10^{-2}$M, indium nitrate at a concentration of about $3.57\times10^{-4}$M-$1.27\times10^{-2}$M, zinc nitrate at a concentration of about $2.5\times10^{-3}$M-$9\times10^{-2}$M, ammonium nitrate at a concentration of about 0.01M-0.5M, sodium thiosulfate at a concentration of about 0.15M-0.6M and thiourea at a concentration of about $3\times10^{-3}$M-1M.

The first carrier 11 is immersed about 5 mm below the solution surface. The second carrier 12 having a plurality of substrates 12*a* is arranged vertical to a bottom surface of the reaction tub 10. As shown in FIG. 2, the substrates 12*a* are held side-by-side by the second carrier holder 14 with a pitch of about 4 mm between two adjacent substrates 12*a*. The second carrier holder 14 may also be provided with a plurality of bars 17, each bar 17 having a length L longer than width W of each substrate 12*a* to ensure that the second carrier 12 is held upright in the solution. The first carrier 11 is irradiated with a 400 W high pressure mercury lamp producing ultra-violet (UV) light with a wavelength of less than 300 nm in the presence of a light converging lens. As the solution is kept at a temperature of about 30-70° C. and a pH of about 8-11, thiosulfate in the solution is excited by UV light to produce electrons and the sulphur atoms, so that these electrons and sulphur atoms can react with the cations, such as silver, indium and zinc to grow $(AgInS_2)_x/(ZnS)_{2(1-x)}$ composite thin film on the first carrier 11, wherein x is 0-1.

The reaction tub 10 is also provided with the stirring component 19, such as magnetite spinning at a rate of about 300 revolutions per minute (rpm) for maintaining a constant concentration of the solution. Similarly, as the solution is kept at a temperature of about 30-70° C. and a pH of about 8-11, thiourea in the solution is hydrolyzed to hydroxysulphide ($SH^-$) and diazomethane ($CH_2N_2$) to generate sulphide ions which react with silver, indium and zinc to grow $(AgInS_2)_x/(ZnS)_{2(1-x)}$ composite thin film on the second carrier 12. Also, thiosulfate in the solution can react with cations or metal ions to generate metal complexes. Then, the metal complexes would react with sulphide ions to form $(AgInS_2)_x/(ZnS)_{2(1-x)}$ composite thin film on the second carrier 12. Thus, formation of metal complexes in the solution reduces the chance of metal sulphide formation in the solution. The efficiency for metal sulphide thin film formation is improved.

To ensure the crystalline structure of the thin film grown, a thermal process is further performed for curing the metal sulphide thin film. Preferably, the metal sulphide thin film is cured at a temperature of about 130° C. for two hours to remove water from the thin film. Next, a thermal process is further performed in a high temperature furnace flushed with nitrogen gas. Preferably, a annealing process is performed on the metal sulphide thin film at a temperature of about 600° C. for about 6 hours before cooling to room temperature to yield metal sulphide crystals.

Example 2

Light Absorbance of $(AgInS_2)_x/(ZnS)_{2(1-x)}$ composite thin film

After a $AgInZn_5S_7$ composite thin film grown by photochemical deposition is annealed at a temperature of about 600° C. for about 6 hours, the composite thin film is tested for light absorbance in terms of transmission percentage. The transmission percentage is a measure of light transmission for the composite thin film against light transmission for the substrate, such as glass.

Figure 3:
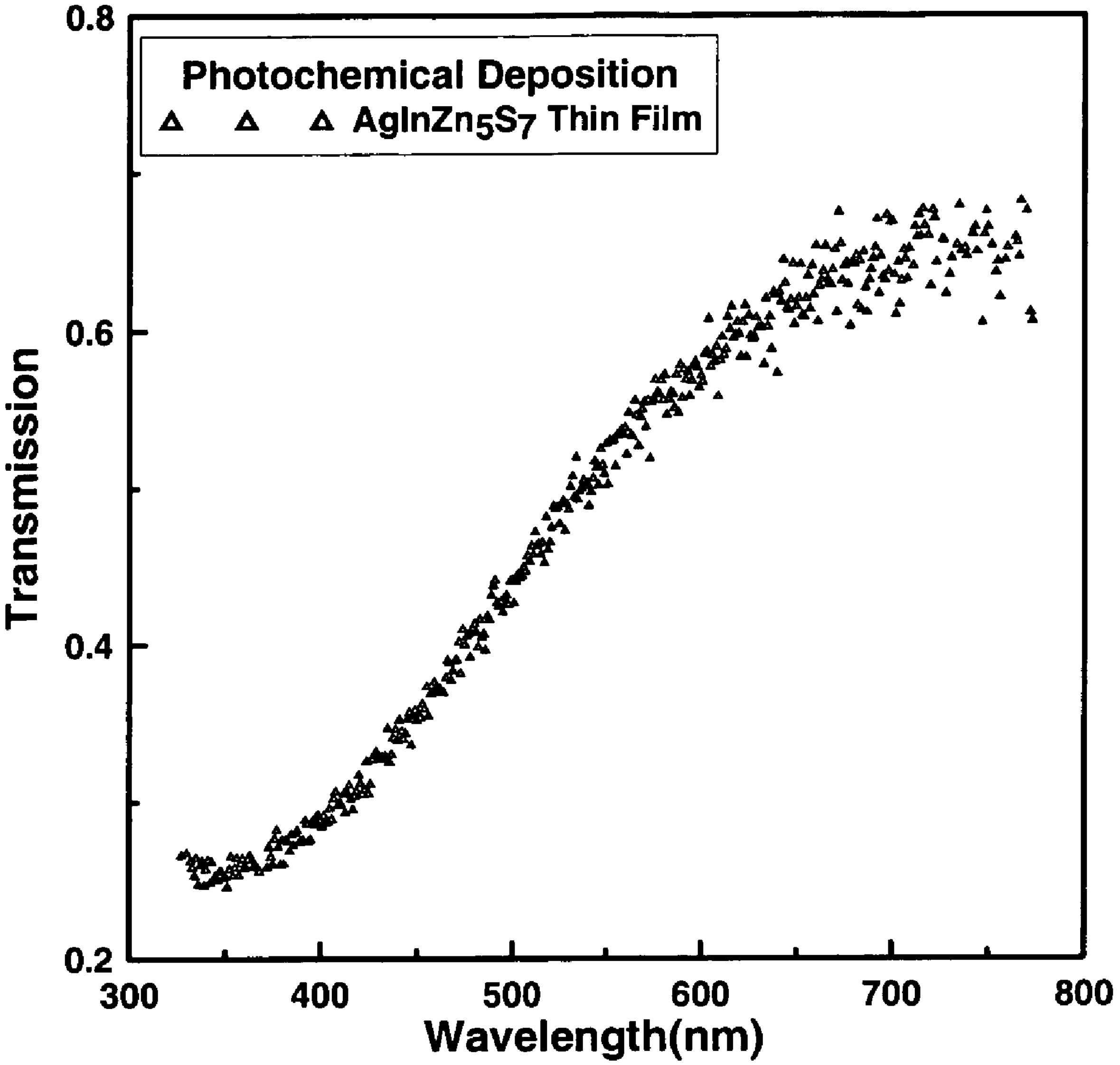
FIG. 3 is a distribution curve showing a relationship of wavelength versus transmission ratio for $AgInZn_5S_7$ thin film grown by photochemical deposition according to the present invention.

Referring to FIG. 3, the relationship of wavelength versus transmission ratio is illustrated for a $AgInZn_5S_7$ thin film grown by photochemical deposition according to the method and apparatus of the invention. As shown in FIG. 3, light transmission for the composite thin film steadily increases as the wavelength of the light increases from 350 nm to 650 nm. Therefore, the composite thin film has an increased absorbance for light having wavelengths from 350-650 nm.

Similarly, a $AgInZn_7S_9$ composite thin film grown by chemical bath deposition is annealed at a temperature of about 600° C. for about 6 hours, and the composite thin film is tested for light absorbance in terms of transmission percentage.

Figure 4:
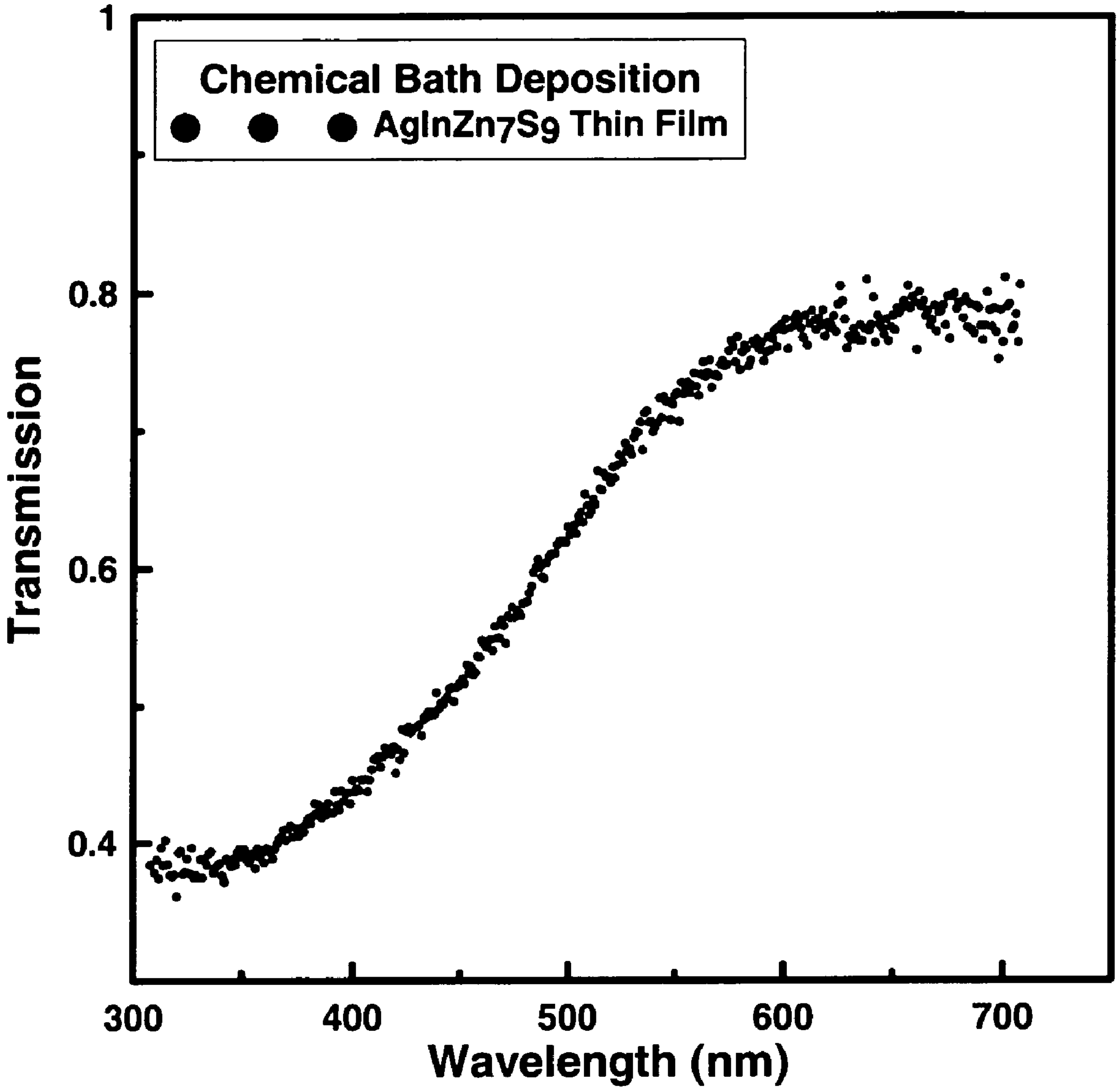
FIG. 4 is a distribution curve showing a relationship of wavelength versus transmission ratio for $AgInZn_7S_9$ thin film grown by chemical bath deposition according to the present invention.

Referring to FIG. 4, a relationship of wavelength versus transmission ratio is illustrated for a $AgInZn_7S_9$ thin film grown by chemical bath deposition according to the method and apparatus of the invention. As shown in FIG. 4, light transmission for the composite thin film steadily increases as the wavelength of the light increases from 300 nm to 600 nm. Therefore, the composite thin film has an increased absorbance for light having wavelength from 300-600 nm.

Figure 5:
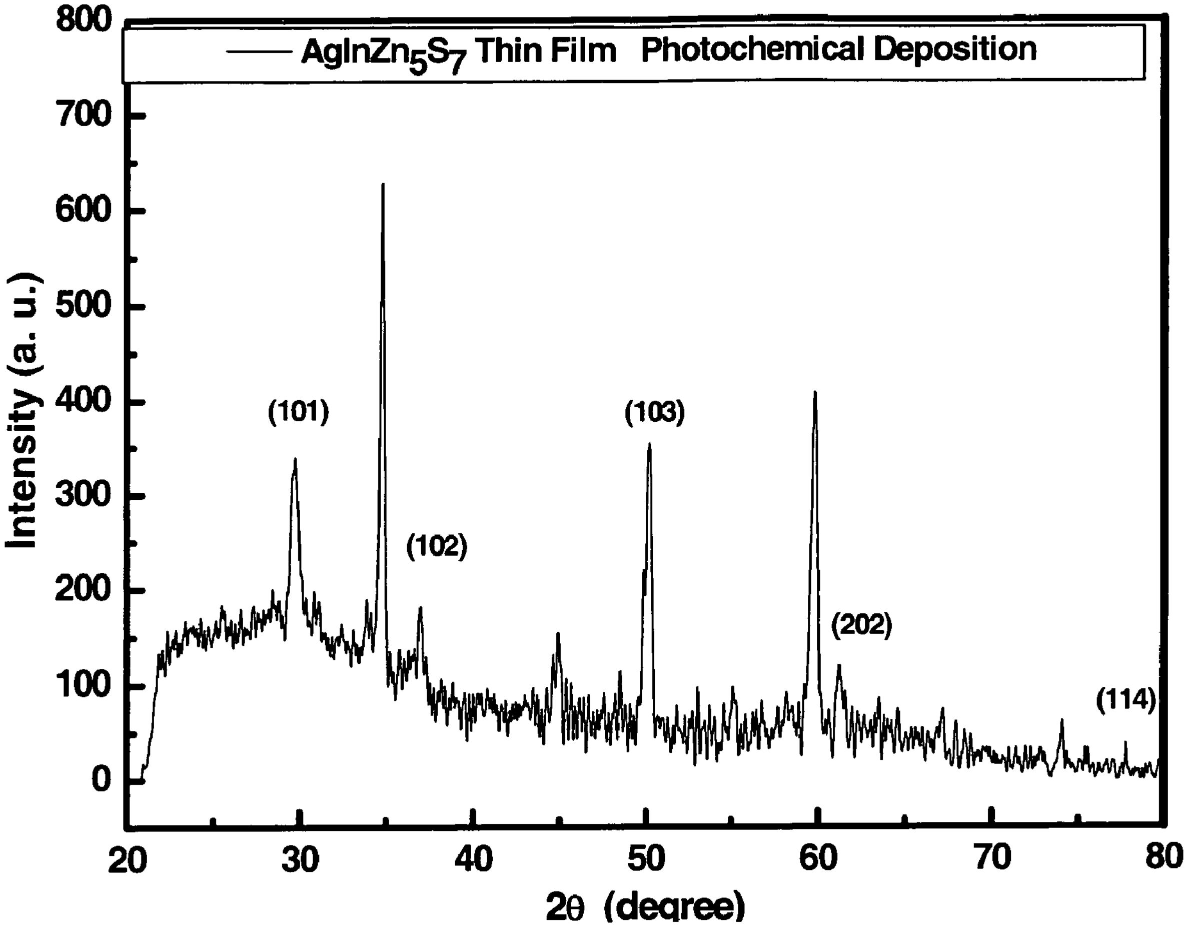
FIG. 5 is a X-ray diffraction (XRD) diagram of $AgInZn_5S_7$ thin film grown by photochemical deposition according to the present invention.

Referring to FIG. 5, a X-ray diffraction (XRD) diagram illustrates a $AgInZn_5S_7$ thin film grown by photochemical deposition according to the method and apparatus of the invention. The powder XRD measurements were carried out using a X-ray diffractometer (Rigaku Miniflex, Japan) with a scan rate of about 2 theta degree/second, and a scan rage of about 20-70 degrees. As shown in FIG. 5, the crystallization of $AgInZn_5S_7$ thin film was observed in this process.

Figure 6:
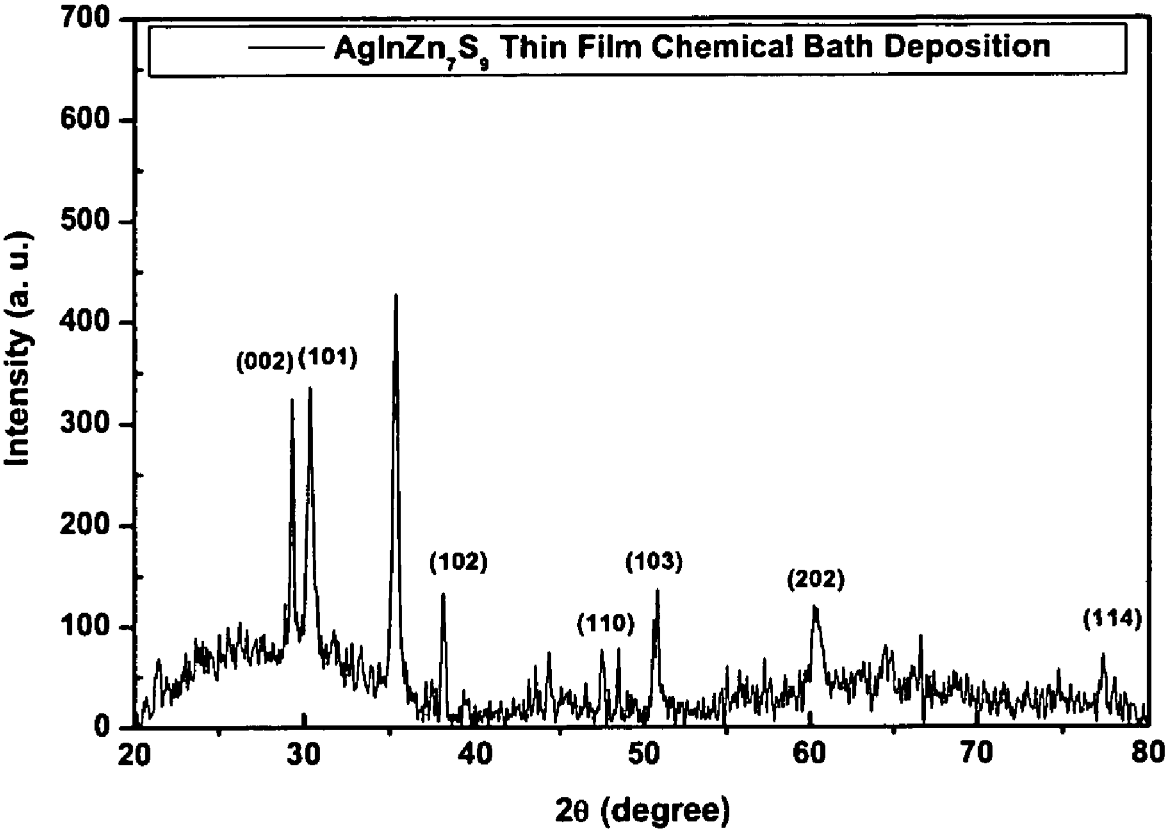
FIG. 6 is a XRD diagram of $AgInZn_7S_9$ thin film grown by chemical bath deposition according to the present invention.

Referring to FIG. 6, a XRD diagram illustrates a $AgInZn_7S_9$ thin film grown by chemical bath deposition according to the method and apparatus of the invention. As shown in FIG. 6, the crystallization of $AgInZn_7S_9$ thin film was observed in this process.

According to the present invention, the method and apparatus for growing metal sulphide thin film are provided. Both photochemical deposition and chemical bath deposition can occur simultaneously in the reaction tub according to the method and apparatus of the invention. Therefore, the metal sulphide thin film or composite metal sulphide thin film is grown on the first and second carriers with a shorter deposition time. Since thiosulfate in the solution is used for generating electrons and sulfur atoms in the photochemical deposition process and forming metal complexes in the chemical bath deposition process, a smaller amount of electroplating solution is used on both deposition processes and the efficiency for forming the metal sulphide photocatalyst is significantly improved. Accordingly, the method and apparatus are provided for forming a large-area metal sulphide thin film applicable to forming solar cell panels, photocatalyst thin films, photoreactors and optoelectronic substrate.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A apparatus for growing a composite metal sulphide thin film, comprising:

a reaction tub having a first carrier and a second carrier held within the reaction tub, wherein the first carrier is held by a first carrier holder below the first carrier and the second carrier is vertically held by a second carrier holder above the second carrier and wherein the second carrier is held vertical to a bottom surface of the reaction tub and the second carrier holder; and a light exposure assembly comprising a frame holding a light source in such a way that the light source is over the reaction tub for irradiating the first carrier.

2. The apparatus according to claim 1, wherein the light has a wavelength of less than 300 nm.

3. The apparatus according to claim 1, wherein the first and second carriers are made of material comprising at least one of iron (Fe), copper (Cu), Boron Phosphorous Silicon Glass (BPSG), silicon glass and indium tin oxide (ITO) glass.

4. The apparatus according to claim 1, further comprising a temperature control assembly coupled to the reaction tub at a temperature optimal for photochemical deposition and chemical bath deposition.

5. The apparatus according to claim 4, wherein the temperature is about 30-90° C.

6. The apparatus according to claim 1, wherein the reaction tub further comprises a stirring component adjacent a bottom surface of the reaction tub.

7. The apparatus according to claim 1, further comprising a transparent lid over the tub.

8. The apparatus according to claim 1, wherein the light exposure assembly further comprising a lens assembly held between the light source and the first carrier for adjusting light exposure area on the first carrier.

9. The apparatus according to claim 1, wherein the second carrier comprises a plurality of substrates held by the second carrier holder with a gap of about 1-10 nm between two adjacent substrates.

10. The apparatus according to claim 1, wherein the composite metal sulphide thin film is $(AgInS_2)_x/(ZnS)_{2(1-x)}$, wherein x is 0-1.

11. The apparatus according to claim 1, wherein the first carrier and second carrier are immersed in a same solution in the reaction tub.

* * * * *